May 20, 1930.　　　G. W. PICKARD　　　1,758,968
ELECTRICAL CONDENSER
Original Filed April 28, 1921
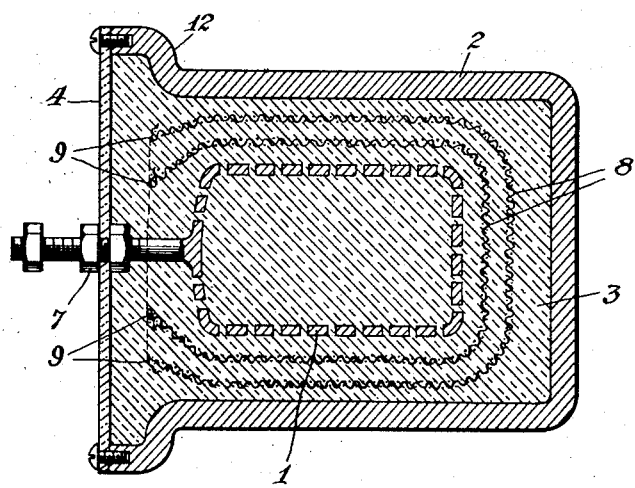
INVENTOR
Greenleaf Whittier Pickard
BY
ATTORNEY Patented May 20, 1930

1,758,968

UNITED STATES PATENT OFFICE

GREENLEAF WHITTIER PICKARD, OF NEWTON CENTER, MASSACHUSETTS, ASSIGNOR TO WIRELESS SPECIALTY APPARATUS COMPANY, OF BOSTON, MASSACHUSETTS, A CORPORATION OF NEW YORK

ELECTRICAL CONDENSER

Original application filed April 28, 1921, Serial No. 465,079. Divided and this application filed April 28, 1923. Serial No. 635,214.

This invention relates to electrical condensers.

This application is a division of my application Serial Number 465,079, filed 28th day of April, 1921.

In condensers now in use, it is usual to build the same in stacks composed of sheets of dielectric, such as mica or paper, and foil. For high potential work, the stack is built up in sections connected in series, and the greater the number of sections the less the capacity will be for a given size sheet. Such condensers are unsatisfactory, however, where high potential current is necessary with comparatively low capacity. Also, such condensers are unsatisfactory and in many cases impossible when employed on high voltage direct current circuits, owing to the difference in leakage across different sections, which soon results in extreme potentials across non-leaky sections, and their destruction. In building such a condenser of mica, for instance, it has been found that the cost is almost prohibitive.

In order to provide a cheap, compact condenser, it is contemplated in the present invention to use sulfur (in a special form) not only as a dielectric but also as a filler. Sulfur also may be used as a detergent, to wash out air and moisture from the condenser. Sulfur has an extremely high insulation resistance, but up to this time its brittleness and porosity have prevented its use to any extent as a dielectric, especially for use in high tension electrical condensers. The advantages of sulfur are as follows: low dielectric loss, high insulation resistance, cheapness, good dielectric strength and high melting point (115°–119° C.). Another characteristic of sulfur which is especially advantageous in condenser manufacture resides in the fact that it does not soften as it approaches the melting point as does a wax, but rather acts like ice, that is to say, remains hard up to the moment of melting and then changes to a thin liquid. Also it is not subject to cold flow.

Sulfur as a solid exists in several allotropic forms as follows: the plastic or amorphous, monoclinic crystalline form and the rhombic octahedra crystalline form.

An object of the invention is to provide a cheap condenser of high efficiency.

Another object of the invention is to employ and prepare the element sulfur in condensers in such wise as to take full advantage of its extremely low dielectric loss and high insulation resistance and at the same time to ensure such condition of the sulfur as to avoid the troubles resulting from the use of so brittle and porous a material.

Another object of the invention is to provide a condenser structure in which the dielectric is also the filler.

Another object of the invention is to provide in a condenser a dielectric or filler having rehealing properties.

Another object of the invention is to provide a condenser which can be operated at temperatures up to 95° C. without detrimental effect.

The particular object of the present invention is a condenser or condenser structure having electrically-conducting parts which are separated from one another by readily liquefiable insulating material and across which parts it is desired to maintain a high potential difference without resulting breakdown of such insulant which is liable to result at points of concentration of the electrostatic field between the conducting parts of high potential difference.

In the accompanying drawing, there is illustrated one of the numerous forms in which the present invention is capable of being embodied.

The drawing is a sectional elevation of a form in which the present invention is capable of being embodied.

The dielectric 3 in the present embodiment of the invention preferably consists of some chemical elemental material having dielectric and insulating properties, such as sulfur or possibly selenium, non-conductive form. The dielectric, usually sulfur, is treated to reduce brittleness and increase compactness, by a process such as hereinafter described so that the sulfur is non-friable, tough, non-porous and very compact, compared to commercial sulfur, and free from fine cracks and voids which cause the wellknown brittleness of commercial sulfur. The degree of compactness of the sulfur product of these processes is such that its density is greater, lacking the voids of ordinary sulfur, than the density of commercial sulfur (roll form) which has a specific gravity of 1.92 and has approximately the specific gravity of a rhombic crystal of sulfur which is 2.07. This compactness is substantially uniform throughout the mass of sulfur dielectric. The comparative compactness and porosity of the product of this invention and that of commercial sulfur may be determined by applying a mixture of red ink or other coloring matter and wood alcohol or other solvent to each. The colored mixture permeates the common form, being rapidly and visibly (by reason of the coloring matter) absorbed into the mass of the material by capillary attraction. In the product of this invention, no appreciable penetration occurs. The condenser casing may have a removable bottom, which is secured to the casing after the process of embedding, whereby the fluid dielectric (molten sulfur) may be poured into the casing from the bottom in the manner hereinafter described, to provide a uniform and solid embedment of sulfur around the terminal and against the cover supporting the latter and allowing the use of a thin mica cover. The cover 4 is secured against the sulfur embedment by nuts on the terminal, the armature being supported chiefly in the solidified sulfur mass without special reliance on the cover. The casing 2 constituting one of the armatures may be of any desirable shape, while the armature 1 within the casing may likewise be of any desirable corresponding or concentric shape or configuration.

The drawing illustrates one or more floating metal conductors 8 embedded in the dielectric 3 between armatures 1 and 2 for equalizing the electrical stress in the dielectric 3 between the armatures and also serving as a reinforcement or supporting medium for the sulfur between the armatures. For mechanical reinforcement solely, the members 8 could be of any suitable material such as a thin, porous paper or gauze, and located at any points where mechanical reinforcement is desired, but these conductors 8 are cup-shaped metal members floating between the armatures and separated therefrom by the readily liquefiable insulant and are arranged to enclose the armature 1 substantially and provide means at spaced distances in the dielectric 3 for equalizing the stress. These floating conductors 8 are preferably rounded and flared away from each other at their free edges at the top 9 providing wider spacing at the top than at the bottom portions, to prevent excessive fields in the dielectric at their edges. They consist preferably of some soft or flexible metal, such as tin or aluminum sheet, whereby, upon the cooling of the condenser and the solidification of the dielectric, they can yield so that no strain will be exerted upon the dielectric by reason of contraction or expansion effects of the metal member 8 or by reason of any inherent resiliency in the metal thereof. In order to allow proper solidification of the insulant 3 and complete embedment and to cause the insulant or dielectric to be anchored to the conductors 8 in intimate contact therewith, the latter are preferably perforated or may consist of metal gauze or screening as illustrated or some similar perforate material, to allow the sulfur to run through the perforations to anchor the same. Or, if plain (imperforate) metal sheets are employed as armatures, it is preferable to cause the sulfur to firmly adhere thereto, which may be done by producing a thin sulfide coat on the sheets, or in other ways to be described later. Likewise the armature 1 may be or is perforated as shown or it may be composed of a relatively fine meshed metal gauze or metal screening to secure the intimate contact between the armature and the insulating embedment, the sulfur or other readily liquefiable embedment filling up the perforations in armature 1 thus anchoring the armature in the filler upon solidification of the filler.

The floating conductors 8 when of metal are for the purpose of distributing the dielectric strain within the dielectric, inasmuch as the sulfur, like all dielectrics, is electrically stronger, (that is, has a higher breakdown strength per unit thickness), when in thin layers, so that the electrical division by conductors 8 of the mass of insulation 3 into thin layers will cause the insulating material and, therefore, the condenser to withstand a higher voltage between the armatures than the same mass of insulating material lacking such metal stress-distributors or equalizers.

By means of the processes hereinafter described, the dielectric or filler of the embodiment of the invention herein disclosed is made holosteric when sulfur is used as is preferable, that is, homogeneous, non-porous and compact throughout its mass. The armatures 1 and 2 may consist of any non-corroding metal, such as aluminum or nickel, or even brass which tends to corrode, that is, to form metallic sulfide.

One process or method which I have devised for securing the compact, non-porous dielectric or filler of the present invention, for filling the condenser casings such as those above described, or for securing the sulfur as a dielectric between the armatures of condensers, is as follows. Each condenser casing or other receptacle in which the condenser armatures are to be embedded is provided temporarily with a casing head thereover, the casing and head being previously warmed to prevent the chilling of the sulfur as it is poured in, and the casing is filled under vacuum, if so desired, through the bottom or top, with melted sulfur. This sulfur should be pure roll sulfur, i. e., sulfur free from impurities such as acids, and should be filtered as it is poured into this casing or receptacle. Any casing or receptacle in which sulfur is heated should be of such material as is not attacked or corroded by sulfur, which corrosion forms sulfids of the metal. Such materials, which should be used throughout in the construction of condenser casing and armatures and in receptacles or other apparatus for heating sulfur, should consist preferably of aluminum, although I have found that brass or nickel or nickel-plated metals are suitable for this purpose. Where the receptacle is to be used merely for heating the sulfur, porcelain or glass or other non-corrosive, non-metallic materials may also be used. In this process, each casing or receptacle is filled with melted sulfur up to the top of the head, which sulfur should preferably be of a temperature between 115° and 155° C., at which temperatures the sulfur consists mainly of thin, watery sulfur containing more or less viscous sulfur, the amount of viscous sulfur increasing with the temperature. These casings may be filled either through the bottom or top, as may be desired, depending upon the results it is desired to obtain, and also, depending upon the structure to be filled. The temperature should be such that the material is freely flowing and as a specific instance, I have found that a temperature of approximately 140° C. is satisfactory.

After the casing and its head have been filled with such molten sulfur as above described, the sulfur is cooked or heated and maintained in the molten condition, at a temperature which does not make the sulfur too viscous to release gases, for several hours, i. e., until the air, moisture and other volatile impurities are driven off and for a substantial time after bubbles appear to rise to the surface. Preferably, this cooking is done while the molten sulfur is in the condenser structure and between the armatures, whereby gaseous impurities and other volatile impurities are also driven out of the condenser structure. In connection with this sulfur cooking process, it is preferable to maintain the temperature as high as possible, in the neighborhood of 185° C., this being the uppermost practical limit for the reason that above this temperature, sulfur tends to catch fire. The higher the temperature, the less time it takes to achieve the results above mentioned. The cooking can also take place at lower temperatures down to 120° C., by continuing this cooking for a longer period. During this heating or cooking of the sulfur, the molten mass is preferably agitated as by stirring or by rocking or vibrating the condenser casing containing the molten sulfur at intervals during the heating, which releases the entrapped air and gases and allows them to rise to the surface.

At at temperature above 155° C., the sulfur is rather viscous and the gases do not readily escape from the mass. I have been able to reduce the time of cooking required at such higher temperatures by alternately lowering and raising the temperature below and above a temperature in the neighborhood of 155° C. to change the condition of the sulfur alternately from the viscous to the thin, limpid condition and vice versa. It is my belief that although the heating of the sulfur or cooking of it at the higher temperatures cause the formation of air bubbles, yet owing to the viscosity of the mass, these bubbles do not readily escape from the mass. However, when the temperature is decreased to transform the sulfur into the limpid variety, the bubbles readily escape or at least rise to the top, above the condenser structure into the casing head. In heating the sulfur at such higher and lower temperatures, the heating is continued for each temperature for a substantial part of the entire time of cooking. During the cooking, the use of a vacuum will substantially lessen the time required to remove the volatile matter. The above-described cooking operation, as I have called it, materially assists in forming the compact, non-porous sulfur of the present invention, and the time of cooking is continued until a sample is of this compact, non-porous character. By way of example only, the cooking may be at a temperature of approximately 170° C. for approximately ten hours. After the sulfur has been thoroughly cooked as above described, it is then allowed to cool upwardly either by the application of cooling to the bottom of the molten mass or by applying heat to the top of the molten sulfur, or both. By the use of a casing head of the character described in the patent to Byron Macpherson, No. 1,502,343, granted July 22, 1924, all shrinkage holes, cracks and voids which tend to form in the sulfur mass upon solidification form in this head above the final embedment within the condenser casing proper, leaving the sulfur in the casing or between the armatures in a compact, holosteric condition, having the properties hereinbefore described. As a substitute for, or in addition to this casing head, air pressure may be applied after filling and after the release of vacuum, if the latter step is used, and this air pressure is maintained preferably until after the solidfication of the sulfur.

If during the solidification or cooling of the sulfur, the molten and now crystallizing mass is stirred, vibrated or otherwise agitated (as by rapidly rotating the receptacle, the method employed depending upon convenience and accessibility of the condenser of different structures), I have discovered that the structure of the solidified sulfur is improved in that the crystals are finer and the formation of longer crystals is prevented, resulting in a fine-grained structure. In stirring, a rod may be used and the stirring may be continued from time to time until complete solidification takes place and in such portions of the sulfur as are still liquid, care being taken not to scrape any sulfur that is already solidified on the armatures. After the solidification, the head is removed, the surplus sulfur formed in the head is cut off or melted off by any suitable means, and the cover or bottom then applied, completing the condenser.

By filling the condenser casings, such as in the form above described, through the bottom, besides providing a very compact mass of dielectric and filler around the condenser terminals, properly and fully insulating the same, the embedment also serves as a backing for the mica cover 4 and obviates the necessity for a very heavy cover, inasmuch as the cover is properly supported and secured by the mass of sulfur below it, which is in close contact with the cover, the armature 1 being suspended from the cover but anchored in the sulfur, so that the sulfur supports both cover and armature.

In casting sulfur as the dielectric or filler of a condenser, it is of first importance that the casting of sulphur be homogeneous or holosteric; that is, that it must be free of air bubbles or voids, and must be compact and non-porous, as otherwise there will be liability of brushing and possible breakdown. It has been found that when sulfur is cast with a head above described, especially if the condenser walls are near together, say about one centimeter apart, the lower half of the cast is fairly homogeneous but there will be occasional voids and the crystal structure is rather coarse and more or less brittle. By the agitation above described, this defect is remedied and the sulfur structure is remarkably fine-grained, hard, non-porous and compact.

In the above description of the condensers, apparatus and methods of utilizing elemental sulfur, I have referred to sulfur generally without any reference as to whether or not any other materials may be incorporated in the sulfur to render it more available for use in condensers. It is within the scope of the present invention, however, to incorporate or use in connection with sulfur as a dielectric other materials as herein described in order to enhance its valve as a practical dielectric in condenser manufacture.

When sulfur solidifies from a liquid watery state, from a temperature around or below 155° C., it normally forms a brittle mass of interlaced crystals, these crystals running in all directions. By treating, as above described, the mechanical structure of the dielectric is improved. I have discovered that the presence in the sulfur of a very small amount, between ¼% and 1%, of non-conductive, glassy, vitreous selenium, an allied chemical element, greatly improves the strength of the sulfur dielectric without in any way impairing its electrical properties. The selenium mixes with the molten sulfur in much the same way that metals mix when they alloy, forming with a part of the sulfur a small amount of low melting point eutectic, which apparently surrounds the sulfur crystals and binds them together in a compact, strong and non-porous mass upon cooling. Traces of paraffin incorporated in the molten sulfur have the same effect, and, furthermore, the presence of such a small amount of selenium sulfur mixture or paraffin, or similar eutectic, tends to hold the sulfur for some time in the amorphous or plastic state, so that it sets slowly, forming a more compact structure.

Great care must be exercised in the sudden method of cooling of the sulfur dielectric or filler or combination dielectric and filler of the present invention when chilled from a molten viscous condition, in order to prevent the viscous sulfur cooling so slowly as to pass through the limpid watery liquid stage, —that is, between 150° and 120° C., and hence into the undesirable brittle sulfur. In some cases, especially in the larger condensers, it is not possible to suddenly cool the entire mass of viscous variety of sulfur, because it cannot be done completely, owing to the insufficient heat radiating and conducting properties of such a large mass or structure. If the sulfur is left alone, however, in cooling the product is brittle and porous, which is undoubtedly poor mechanically and electrically. To provide substitute methods or supplemental methods for the sudden cooling of the sulfur to the plastic condition, expedients are provided, one of which is the rotation of the condenser while cooling, as above mentioned. Then again a strong electric field may be applied while cooling. Further, if, during such application of potential during cooling, the applied potential be high enough, of the order of the breakdown strength of the sulfur, and continued after the bulk of the sulfur has solidified, any crack which may form will cause a breakdown and local formation of liquid sulfur and a complete healing.

A very small amount of paraffin mixed with molten sulfur, say less than one per cent. or around one-half per cent. or one-quarter per cent., is sufficient to greatly retard the conversion of plastic sulfur into crystalline form, and this results in a very dense and tough mass having a pale chocolate color. The structure of the condensers using sulfur with traces of eutectic, such as selenium mixture or paraffin, is in no way different from condensers using pure sulfur, and the only object of using such mixtures is to get a better,—that is, a more compact and tough,—structure for the dielectric. The eutectic of the present invention is preferably a suitable relatively low melting point dielectric material which can mix thoroughly with the molten sulfur, either in the limpid or viscous form, throughout its mass and hold the crystals together upon cooling. Where paraffin is used, it is easier to mix it with the sulfur when the latter is in a viscid condition by vigorous stirring on account of the different specific gravities of the two.

In the process above described, great care should be exercised to exclude air and moisture from the sulfur to prevent the formation of sulfur acids. In constructing certain types of condensers for special service, it may be necessary, during the cooling and filling operation, to employ vacuum to remove the air.

The present invention provides a compact cheap condenser which is adapted for general uses especially for low capacity and high voltage work and in which the sulfur or other readily liquefiable insulant is used either as a dielectric, filler or combination filler and dielectric and wherein the insulating filler or dielectric is broken or split electrically, so to speak, by the stress-equalizing metal members which increase the breakdown point of the condenser and also mechanically strengthen the readily liquefiable insulating material. Sulfur when treated by the processes herein described is superior to wax for a filler or dielectric, because of its higher dielectric constant and lower loss compared with wax at high temperatures, and because sulfur withstands temperatures of a relatively higher order and also brush discharges without chemical change. Wax, on the other hand, carbonizes and releases various liquids and gases at higher temperatures. Another property of sulfur is its ability to withstand breakdown and reheal without any change whatsoever and its apparent greater thermal conductivity as compared with waxes.

It is to be understood that the invention is not limited to the embodiments and features specifically shown and described herein, but that such embodiments and features are subject to changes and modifications without any departures from the spirit of the invention.

I claim:—

1. An electrical condenser structure comprising electrically conducting parts separated from one another by a substantial thickness of a solid readily liquefiable insulant, and a sheet embedded in and surrounded by said insulant in position separated from said conducting parts, said sheet being formed with holes filled with the insulant whereby the latter extends continuously between the conducting parts but is strengthened by said sheet.

2. In an electrical condenser, spaced armatures, a solid fusible dielectric between said armatures, and a perforate metal element embedded in said dielectric and between said armatures for equalizing the stress in the dielectric caused by the action of said armatures.

3. A condenser having alternate conductors and dielectric, said dielectric comprising sulfur having mixed therewith a eutectic and a porous gauze embedded in said sulfur.

4. In an electrical condenser structure comprising electrically conducting parts separated from one another by a mass of solid readily liquefiable insulating material, the means for increasing the mechanical strength and break-down point of such material, which consists of a metal member embedded in and surrounded by said insulant in position separated from said conducting parts by the insulant, said metal member being formed with holes filled by the insulant whereby the latter extends continously between the conducting parts but is mechanically strengthened by said perforated metal member.

5. In an electrical condenser, armatures, one of which encloses the other but is formed with an opening and an insulating cover therefor, the enclosed armature having a terminal lead extending out through the opening in the enclosing armature and thru said insulating cover; a stress-equalizing conductor located in the space between the armatures and substantially enclosing the enclosed armature but having a substantial opening around the lead from the enclosed armature and in the vicinity of the opening through the enclosing armature; and a solid condenser dielectric between said armatures consisting of a material which can be cast in the enclosing armature; said stress-equalizing conductor consisting of a material which can yield to the dielectric casting during the cooling and solidification thereof and thereafter serve as a mechanical reenforcement of said dielectric casting.

6. In an electrical condenser, armatures, one of which encloses the other, the latter having a terminal extending through a hole in the enclosing armature; a readily liquefiable solid insulating material enclosed by the enclosing armature and surrounding the enclosed armature, separating the two armatures from one another; and a cup-shaped, flexible, non-resilient sheet-metal structure substantially surrounding the inside armature and formed with holes filled with said insulant; the open end of said cup-shaped structure being located near the opening through the enclosing armature and surrounding the terminal lead from the enclosed armature.

7. In an electrical condenser, two armatures, one enclosing the other, and separated from one another by a solid readily liquefiable insulant, the enclosed armature being formed with recesses filled with said insulant; and a metal member embedded in the insulant in position between the armatures and substantially surrounded by the insulant and thereby separated from the armatures.

GREENLEAF WHITTIER PICKARD.